(12) United States Patent
Hashigami

(10) Patent No.: US 11,664,705 B2
(45) Date of Patent: May 30, 2023

(54) COOLING STRUCTURE FOR ROTARY ELECTRIC MACHINE

(71) Applicant: TOYOTA JIDOSHA KABUSHIKI KAISHA, Aichi-ken (JP)

(72) Inventor: Satoru Hashigami, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 101 days.

(21) Appl. No.: 17/396,765

(22) Filed: Aug. 9, 2021

(65) Prior Publication Data

US 2022/0140698 A1 May 5, 2022

(30) Foreign Application Priority Data

Nov. 5, 2020 (JP) .............................. JP2020-185417

(51) Int. Cl.
*H02K 9/19* (2006.01)
*H02K 1/20* (2006.01)
*H02K 1/16* (2006.01)

(52) U.S. Cl.
CPC ................ *H02K 9/19* (2013.01); *H02K 1/20* (2013.01); *H02K 1/16* (2013.01); *H02K 2209/00* (2013.01)

(58) Field of Classification Search
CPC ......... H02K 1/20; H02K 9/19; H02K 2209/00
USPC ..................................... 310/54, 58, 59, 60 A
See application file for complete search history.

(56) References Cited

U.S. PATENT DOCUMENTS 1,448,700 A * 3/1923 Seidner .................... H02K 9/00
310/64
2020/0161947 A1* 5/2020 Almeida E Silva ..... H02K 3/48

FOREIGN PATENT DOCUMENTS

| JP | 201427778 A | 2/2014 | |
|---|---|---|---|
| JP | 2016174443 A | 9/2016 | |
| JP | 202039232 A | 3/2020 | |
| WO | WO-2012118008 A1 * | 9/2012 | ............... H02K 1/20 |

OTHER PUBLICATIONS

Machine Translation of WO 2012118008 A1, Published Year 2012 (Year: 2012).*

* cited by examiner

*Primary Examiner* — Ahmed Elnakib
*Assistant Examiner* — Minki Chang
(74) *Attorney, Agent, or Firm* — Hauptmah Nam, LLP

(57) ABSTRACT

A cooling structure for a rotary electric machine includes: a plurality of cooling holes provided such that the cooling holes penetrate from an outer peripheral surface of a stator core to respective slots; a refrigerant supply mechanism configured to supply liquid refrigerant to supply cooling holes among the cooling holes, the supply cooling holes being configured such that radially outer ends of the supply cooling holes are placed above radially inner ends of the supply cooling holes in the gravitational direction; and a refrigerant guide provided between a rotor and a stator and configured to catch the liquid refrigerant falling down from the radially inner ends of the supply cooling holes through their corresponding slots and to guide the liquid refrigerant to slots placed on the lower side in the gravitational direction among the slots.

8 Claims, 8 Drawing Sheets

COOLING STRUCTURE FOR ROTARY ELECTRIC MACHINE

CROSS-REFERENCE TO RELATED APPLICATION

This application claims priority to Japanese Patent Application No. 2020-185417 filed on Nov. 5, 2020, incorporated herein by reference in its entirety.

BACKGROUND

1. Technical Field

The present specification describes a cooling structure for cooling a rotary electric machine placed in a posture where its axial direction intersects with the vertical direction.

2. Description of Related Art

In recent years, further downsizing and high output of a rotary electric machine have been demanded. In a case where the rotary electric machine is downsized and achieves high output, the heat capacity of the rotary electric machine decreases while the calorific value of the rotary electric machine increases. Accordingly, temperature rise in the rotary electric machine becomes a large problem. Particularly, a stator coil in a slot has a large calorific value but can hardly dissipate heat. Accordingly, it is necessary to efficiently cool the stator coil.

In view of this, many cooling structures for cooling a stator coil by directly supplying liquid refrigerant to the stator coil have been proposed in the related art. For example, Japanese Unexamined Patent Application Publication No. 2014-027778 (JP 2014-027778 A) describes a rotary electric machine in which a rotor core is provided with a communication passage penetrating the rotor core in its radial direction, and liquid refrigerant is supplied from a radially inner end of the communication passage. In this case, when a rotor rotates at high speed, the liquid refrigerant gushes out of a radially outer end of the communication passage and hits a stator coil. By directly supplying the liquid refrigerant to the stator coil as such, the stator coil can be cooled effectively.

SUMMARY

However, in a case where the liquid refrigerant gushes out from the rotor core by use of centrifugal force like JP 2014-027778 A, when the rotor stands still or rotates at low speed, the liquid refrigerant does not gush out appropriately due to insufficiency of the centrifugal force. As a result, a large amount of the liquid refrigerant might remain on an outer peripheral surface of the rotor core. When the liquid refrigerant remains on the outer peripheral surface of the rotor core, a so-called drag loss that is rolling friction of the rotor and is caused due to the liquid refrigerant decreases.

In view of this, the present specification describes a cooling structure for a rotary electric machine that can effectively cool a stator coil while a drag loss is restrained from being decreased.

A cooling structure for a rotary electric machine, described in the present specification, is A cooling structure for a rotary electric machine placed in a posture where an axial direction of the rotary electric machine intersects with a vertical direction. The cooling structure includes a plurality of cooling holes, a refrigerant supply mechanism, and a refrigerant guide. The cooling holes are provided such that the cooling holes penetrate from an outer peripheral surface of a stator core to respective slots. The refrigerant supply mechanism is configured to supply liquid refrigerant to supply cooling holes among the cooling holes. The supply cooling holes are configured such that radially outer ends of the supply cooling holes are placed above radially inner ends of the supply cooling holes in the gravitational direction. The refrigerant guide is provided between a rotor and a stator. The refrigerant guide is configured to catch the liquid refrigerant falling down from the radially inner ends of the supply cooling holes through slots corresponding to the supply cooling holes among the respective slots and to guide the liquid refrigerant to slots placed on the lower side in the gravitational direction among the respective slots.

The liquid refrigerant is supplied to a stator coil in the slots via the cooling holes. Accordingly, it is possible to efficiently cool the stator coil. In the meantime, the liquid refrigerant falling from the slots is caught by the refrigerant guide provided between the stator and the rotor. This prevents the liquid refrigerant from being attached to the rotor. As a result, it is possible to restrain a decrease in a drag loss.

In this case, the refrigerant guide may have an annular shape disposed concentrically with the stator and the rotor.

With such a configuration, it is possible to more surely prevent the liquid refrigerant from being attached to the rotor, eventually, the decrease in the drag loss.

Further, the refrigerant guide may include: an inner peripheral wall extending along an outer peripheral surface of the rotor; a pair of side walls provided such that the side walls stand radially outwardly from opposite ends of the inner peripheral wall in an axial direction of the refrigerant guide, and a pair of outer peripheral walls provided such that the outer peripheral walls extend in the axial direction from respective radially outer ends of the side walls toward respective counterpart side walls.

By providing the side walls and the outer peripheral walls, it is possible to more surely prevent the liquid refrigerant landing on the inner peripheral wall from leaking to the rotor side, thereby making it possible to more surely prevent the decrease in the drag loss.

In this case, a plurality of via-holes through which the liquid refrigerant passes may be formed in at least either of the outer peripheral walls and corners between the outer peripheral walls and the side walls.

In a range above a central horizontal line that is a horizontal line passing through a rotation center of the rotor, the via-holes function as passages that guide the liquid refrigerant thus falling down into the refrigerant guide. Further, in a range below the central horizontal line, the via-holes function as passages that guide the liquid refrigerant in the refrigerant guide to the slots. Accordingly, by adjusting the shape and so on of the via-holes, the amount of the liquid refrigerant falling down from the refrigerant guide to the slot side can be controlled.

Further, in a range below a central horizontal line that is a horizontal line passing through a rotation center of the rotor, at least either of the number of the via-holes and areas of the via-holes may be made smaller as the via-holes get closer to the lower side in the gravitational direction.

In a case where all the via-holes have the same magnitude, in the range below the central horizontal line, the liquid refrigerant easily passes through the via-holes as the via-holes get closer to the lower side in the gravitational direction. This causes deviation in the supply amount of the liquid refrigerant to the slots. However, with the above configuration, the supply amounts of the liquid refrigerant to the slots are evenly dispersed in the circumferential direction.

In this case, the inner peripheral wall and the outer peripheral walls may be each constituted by two or more surfaces arranged in the axial direction such that an angle is formed between adjacent surfaces among the two or more surfaces. In each of the outer peripheral walls, the via-holes may be formed in a V-shaped portion formed between two surfaces intersecting with each other among the two or more surfaces or in a V-shaped portion formed between a corresponding one of the side walls and a surface among the two or more surfaces, the surface intersecting with the corresponding one of the side walls.

With such a configuration, the liquid refrigerant is easily gathered together in a valley part of the V-shaped portion, so that the liquid refrigerant easily falls down by the action of gravity. Further, by forming the via-holes in the V-shaped portion, the liquid refrigerant can be moved efficiently to inside and outside the refrigerant guide.

Further, the refrigerant guide may be made of a material having a nonmagnetic property and a high heat transfer property.

When the refrigerant guide is made of a material having a nonmagnetic property, the refrigerant guide does not affect a magnetic property of the rotary electric machine. Further, when the refrigerant guide is made of a material having a high heat transfer property, heat is dispersed effectively, thereby making it possible to prevent local concentration of the heat.

Further, a stator coil may include a plurality of segment coils, and a connecting member via which tail ends of two segment coils among the segment coils are connected to each other in each of the respective slots. The refrigerant guide may be fixed to the connecting member.

With such a configuration, the refrigerant guide can be fixed to the stator.

Further, a notch portion may be formed in an axially central part of a radially inner end of each of teeth such that at least part of the refrigerant guide is accommodated in the notch portion.

With such a configuration, it is possible to separate the refrigerant guide from the rotor without increasing a gap between the stator and the rotor.

With the cooling structure for the rotary electric machine, described in the present specification, it is possible to restrain the decrease in the drag loss and to efficiently cool the stator coil.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
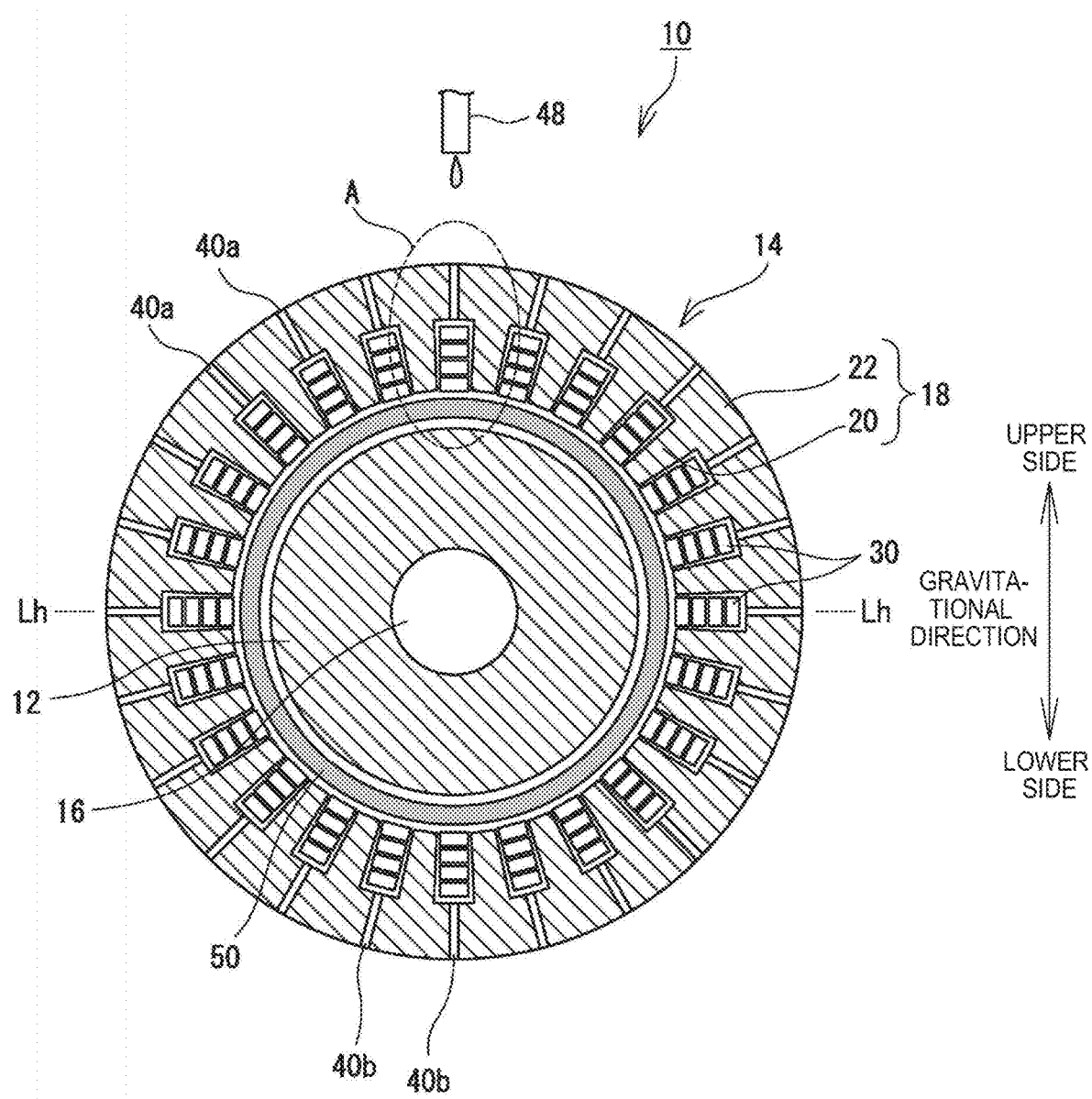
FIG. 1 is a cross-sectional view of a rotary electric machine.
Figure 2:
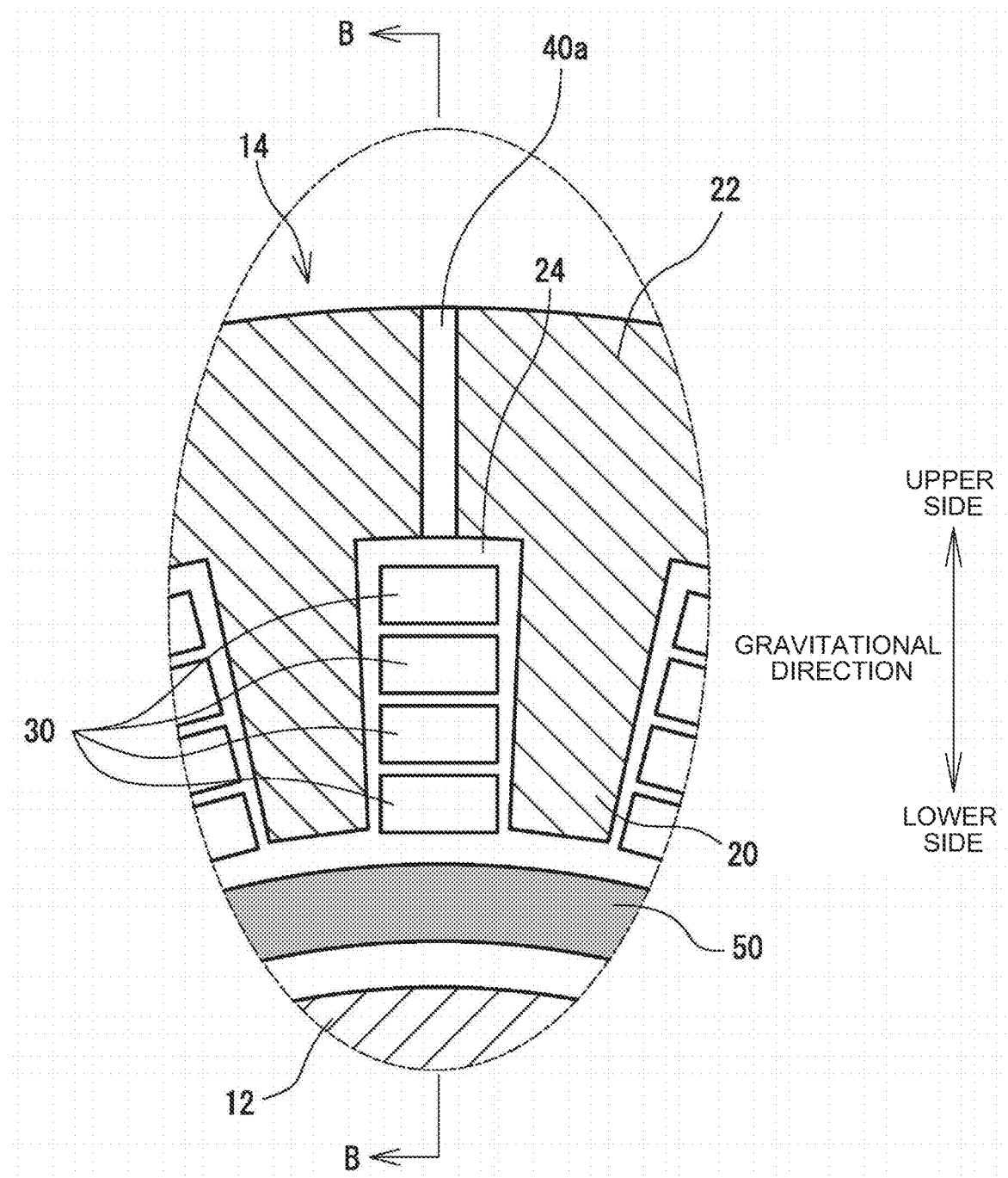
FIG. 2 is an enlarged view of a part A in FIG. 1.
Figure 3:
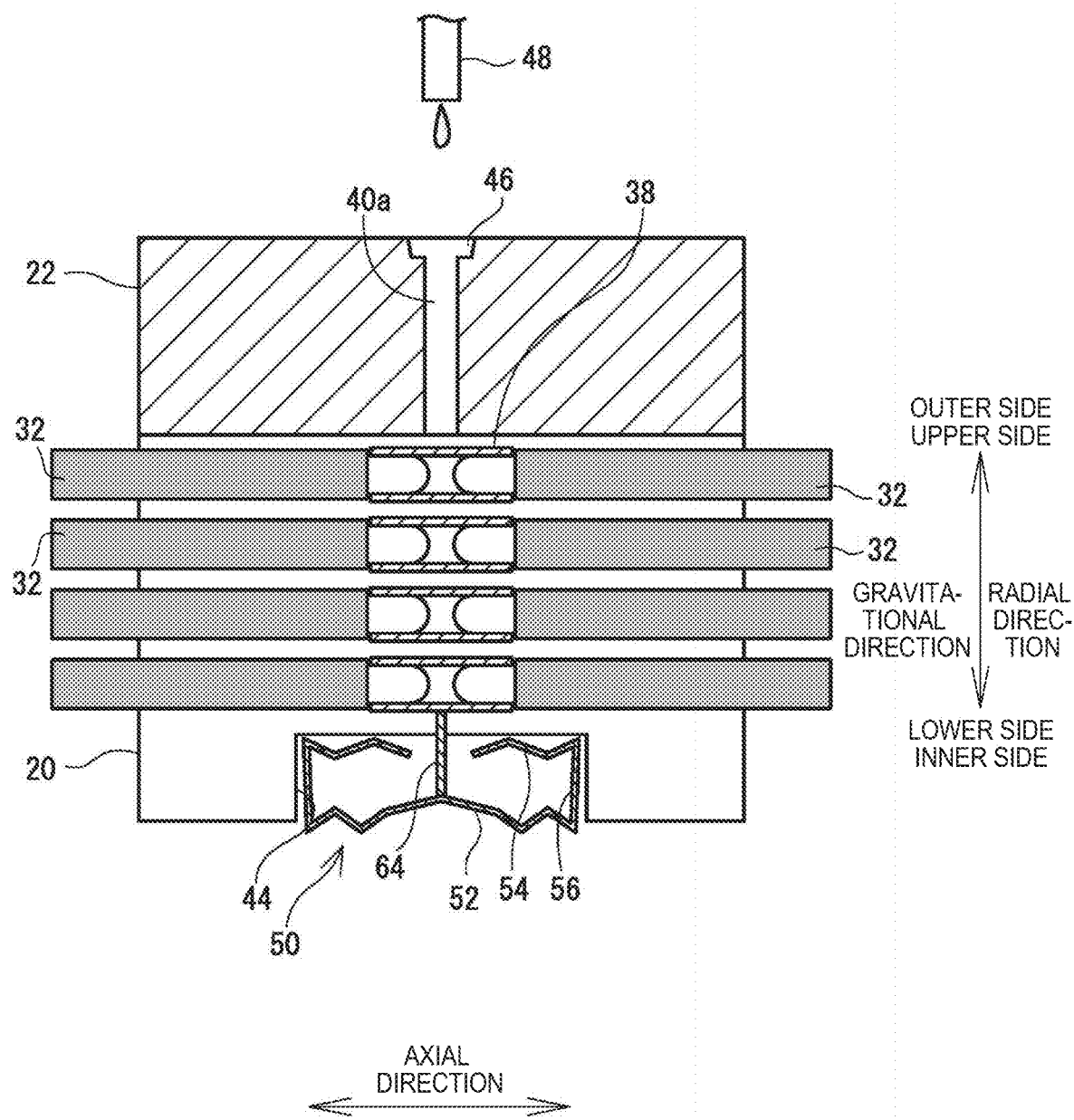
FIG. 3 is a sectional view taken along a line B-B in FIG. 2.
Figure 4:
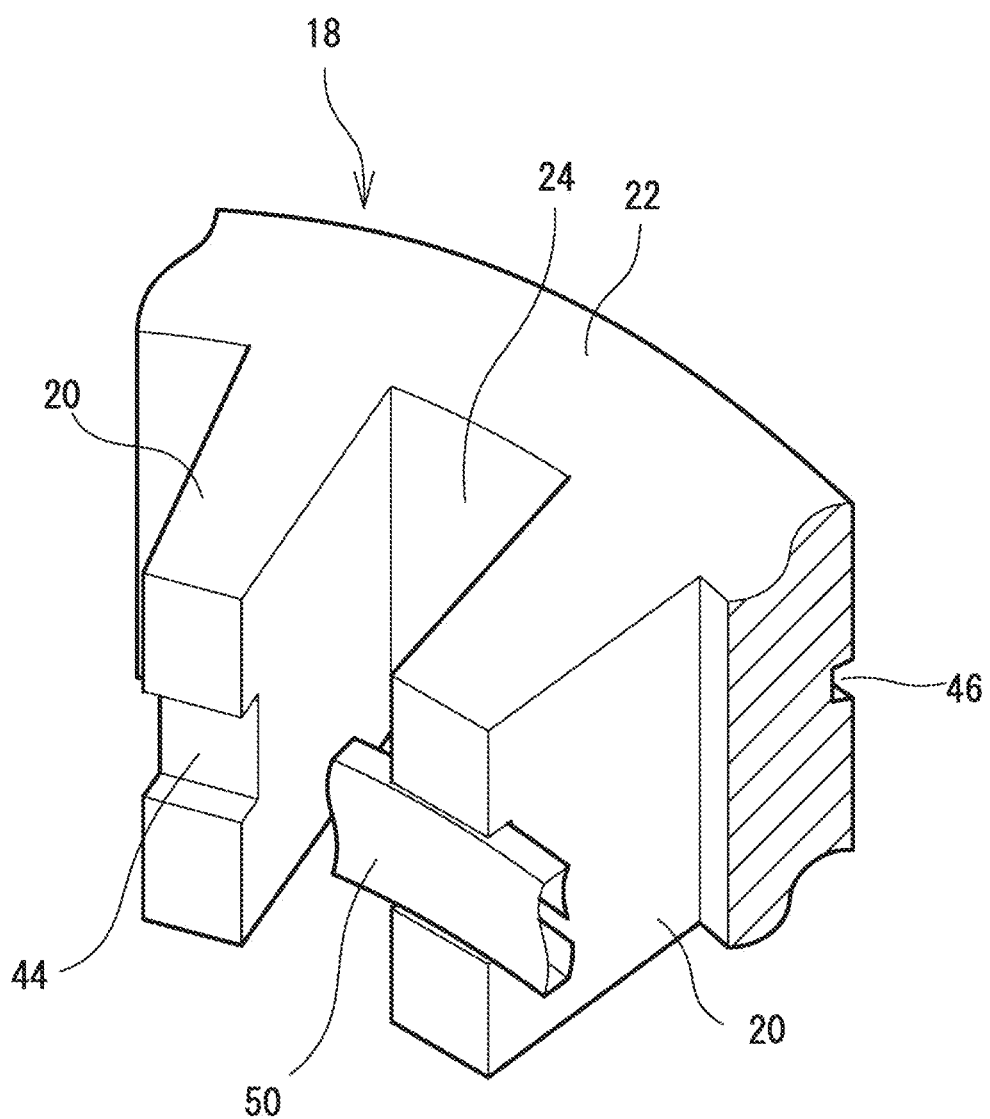
FIG. 4 is a partial perspective view of a stator core.

With reference to the drawings, the following describes a cooling structure for a rotary electric machine 10. FIG. 1 is a cross-sectional view of the rotary electric machine 10, and FIG. 2 is an enlarged view of a part A in FIG. 1. Further, FIG. 3 is a sectional view taken along a line B-B in FIG. 2, and FIG. 4 is a partial perspective view of a stator core 18. Note that, in the following description, an "axial direction," a "circumferential direction," and a "radial direction" indicate the axial direction of the rotary electric machine 10, the circumferential direction of the rotary electric machine 10, and the radial direction of the rotary electric machine 10, respectively.

The rotary electric machine 10 is a permanent magnet synchronous rotary electric machine configured such that permanent magnets (not illustrated) are embedded in a rotor core. The rotary electric machine 10 is provided in an electric vehicle, for example. In the electric vehicle, the rotary electric machine 10 may be used as a drive motor configured to generate power to drive a vehicle or may be used as a generator configured to generate electric power by regenerative braking force or excessive power of an engine. In the electric vehicle, the rotary electric machine 10 is placed in a posture where its rotating shaft 16 intersects with the gravitational direction, more specifically, in a posture where the rotating shaft 16 is generally horizontal. In FIGS. 1 to 3, the up-down direction on the plane of paper corresponds to the gravitational direction. Note that the rotary electric machine 10 may be placed in a posture where the rotating shaft is inclined from the horizontal direction, provided that the rotating shaft 16 intersects with the gravitational direction.

The rotary electric machine 10 includes the rotating shaft 16, a rotor 12 fixed to the rotating shaft 16, and a stator 14 disposed outwardly from the rotor 12, and these members are accommodated in an outer packaging case (not illustrated). The rotating shaft 16 is supported by the outer packaging case via a bearing (not illustrated) such that the rotating shaft 16 is axially rotatable. The rotor 12 is a generally annular member including a rotor core made of laminated steel sheets or the like and a plurality of permanent magnets embedded in the rotor core. The rotor 12 is fixed to the rotating shaft 16, and the rotating shaft 16 rotates integrally with the rotor 12.

The stator 14 includes the stator core 18 and a stator coil 30. The stator core 18 is a generally annular member made of laminated steel sheets or the like and includes an annular yoke 22 and a plurality of teeth 20 projecting radially inward from an inner peripheral surface of the yoke 22. A winding wire constituting the stator coil 30 is wound around each of the teeth 20. A winding method of the winding wire may be concentrated winding in which a winding wire is wound around one tooth 20 or may be distributed winding in which a winding wire is wound over a plurality of teeth.

The stator coil 30 is configured by connecting three phase coils, that is, a U-phase coil, a V-phase coil, and a W-phase coil. A connecting form of the coils is not limited particularly, but in the present embodiment, a star connection in which respective tail ends of the three phase coils are connected collectively at a neutral point. In a case where the rotary electric machine 10 is used as an electric machine, a three-phase alternating current is applied to the stator coil 30. Hereby, a rotating magnetic field is formed, so that the rotor 12 rotates. Further, in a case where the rotary electric machine 10 is used as a generator, the rotating shaft 16 and the rotor 12 are rotated by regenerative braking force of the vehicle or excessive power of the engine. Hereby, a current is guided to the stator coil 30.

Figure 5:
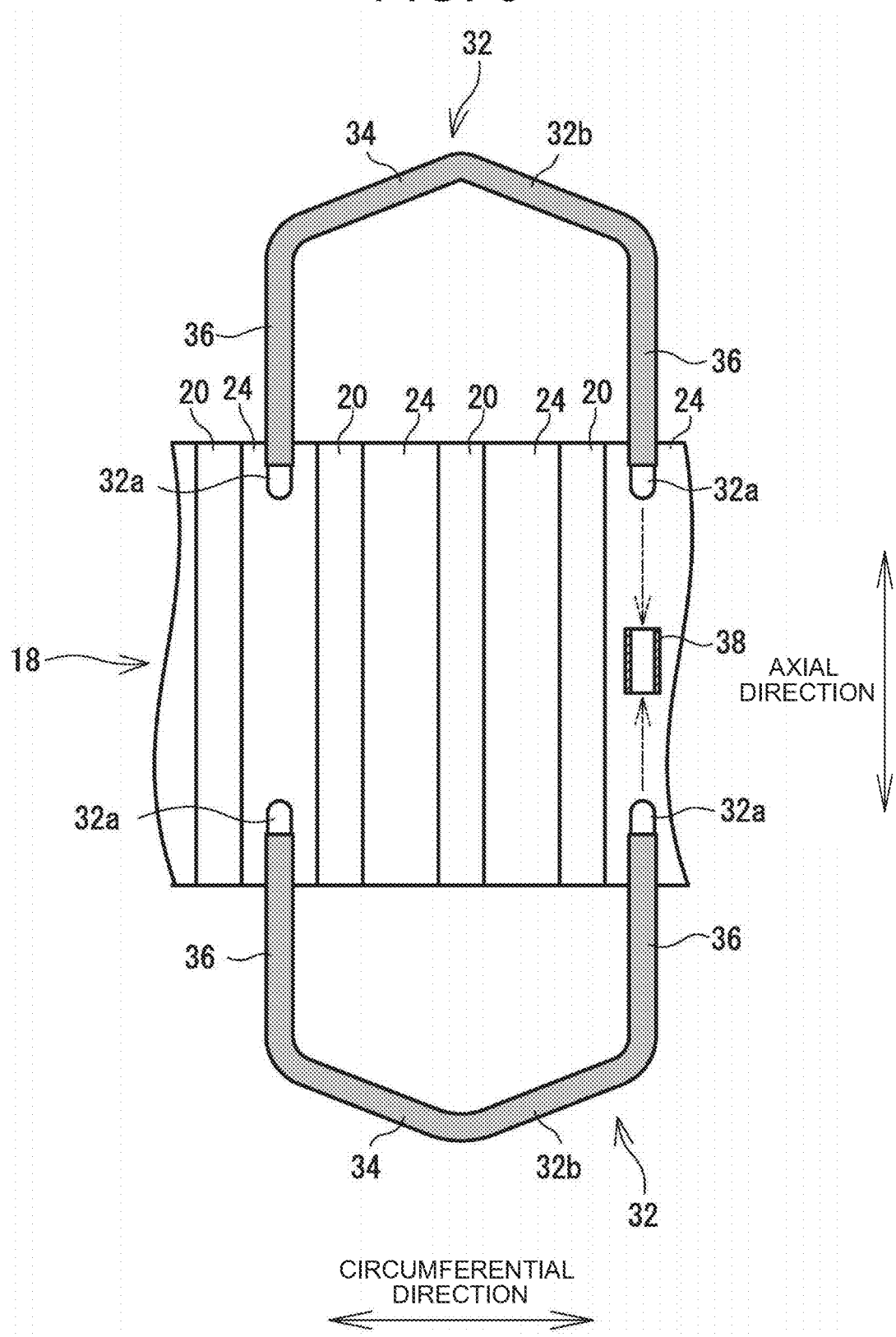
FIG. 5 is a view to describe a segment coil and an exploded perspective view of a stator viewed from its inner peripheral side.

In the present embodiment, the stator coil 30 is configured such that a plurality of segment coils 32 is connected. FIG. 5 is a view to describe the segment coils 32 and an exploded perspective view of the stator 14 viewed from its inner peripheral side. The segment coil 32 is configured such that a lead wire 32a made of a conductive material (e.g., copper or the like) is coated with an insulating coating 32b (illustrated in black hatching) made of an insulating material (e.g., resin). The lead wire 32a is a square wire having a generally rectangular sectional shape.

Further, the segment coil 32 is bent and shaped into the same shape as a shape at the time when the stator is completed, that is, a final shape. More specifically, the segment coil 32 has a generally U-shape including a pair of linear portions 36 accommodated in respective slots 24, and a bridge portion 34 via which the linear portions 36 are connected to each other. In a tail end of the linear portion 36, the insulating coating 32b is removed, so that the lead wire 32a is exposed to the outside.

Each segment coil 32 is inserted to the stator core 18 from outside the stator core 18 so that its linear portion 36 enters its corresponding slot 24. As a result, inside the slot 24, the linear portion 36 inserted into the slot 24 from a first axial end side of the stator core 18 and the linear portion 36 inserted into the slot 24 from a second axial end side of the stator core 18 are present. Respective tail ends of the two linear portions 36 are electrically and mechanically connected to each other by a connecting member 38 inside the slot 24. The connecting member 38 is a tubular body made of a conductive material. Respective tail ends of the two linear portions 36 are fitted by pressing into the opposite ends of the connecting member 38. Hereby, the two linear portions 36 are electrically and mechanically connected to each other inside the slot 24. Accordingly, in the present embodiment, the connecting member 38 is placed inside the slot 24. Note that the connecting member 38 is not limited to a tubular body and may have any shape, provided that two segment coils 32 can be connected by the connecting member 38. For example, the connecting member may be a bar material having recessed portions in which distal ends of the segment coils 32 can be fitted.

In the meantime, such a rotary electric machine 10 generates heat along with its driving, so that its temperature increases. Particularly, a large amount of heat is generated from the stator coil 30 along with current application to the stator coil 30. Meanwhile, a large part of the stator coil 30 is closely placed in semi-closure spaces as the slots 24, so that heat from the stator coil 30 can be hardly dissipated. This accordingly causes such a problem that the temperature of the stator coil 30, particularly, the temperature of the linear portions 36 placed inside the slots 24 easily increases excessively.

In view of this, in the related art, there has been proposed a cooling structure for cooling the stator coil 30 by directly applying liquid refrigerant to the stator coil 30 in order to efficiently cool the rotary electric machine 10, particularly, the stator coil 30. In order to apply the liquid refrigerant to the stator coil 30, centrifugal force to be generated along with rotation of the rotor 12 is often used in the related art. That is, such a configuration is known that a flow path is formed in a rotor core in a radially penetrating manner, and liquid refrigerant is supplied from a radially inner end of the flow path. In such a configuration, the liquid refrigerant gushes out radially outwardly from a radially outer end of the flow path due to centrifugal force to be generated along with rotation of the rotor 12. Hereby, the liquid refrigerant hits an inner peripheral surface of the stator 14 and the stator coil 30, so that the stator 14 and the stator coil 30 are cooled.

However, in a case where the rotor 12 stands still or rotates at low speed, the cooling structure using the centrifugal force cannot obtain sufficient centrifugal force. As a result, the liquid refrigerant does not gush out vigorously, so that a large amount of the liquid refrigerant remains on an outer peripheral surface of the rotor 12. The liquid refrigerant remaining on the outer peripheral surface of the rotor 12 causes a decrease in a drag loss of the rotor 12.

In view of this, in the present embodiment, a refrigerant guide 50 is provided such that the refrigerant guide 50 supplies liquid refrigerant from the radially outer side of the stator core 18 and guides the liquid refrigerant to a necessary position without causing the liquid refrigerant to be attached to the rotor 12. The following describes this point more specifically.

In the present embodiment, in order to supply liquid refrigerant from the radially outer side of the stator core 18, a plurality of cooling holes 40a, 40b is provided in the stator core 18 as illustrated in FIGS. 1 to 3. The cooling holes 40a, 40b are holes penetrating from the outer peripheral surface of the stator core 18 to respective slot 24. One cooling hole 40a, 40b is provided in one slot 24 such that the cooling hole 40a, 40b extends in the radial direction. Among the cooling holes, cooling holes each configured such that a radially outer end is placed above a radially inner end in the gravitational direction function as supply cooling holes 40a that receive supply of the liquid refrigerant. Further, among the cooling holes, cooling holes each configured such that a radially outer end is placed below a radially inner end in the gravitational direction function as discharge cooling holes 40b from which the liquid refrigerant is discharged to outside the stator 14. Accordingly, in the example of FIG. 1, the cooling holes placed above a central horizontal line Lh passing through a rotation center of the rotor 12 function as the supply cooling holes 40a, while the cooling holes placed below the central horizontal line Lh function as the discharge cooling holes 40b. In the following description, when the supply cooling holes 40a and the discharge cooling holes 40b are not distinguished from each other, they are just referred to as the "cooling holes 40."

The rotary electric machine 10 is further provided with a refrigerant supply mechanism configured to supply the liquid refrigerant to the supply cooling holes 40a. Various configurations are conceivable for the refrigerant supply mechanism. However, in the present embodiment, the refrigerant supply mechanism includes a supply pipe 48 configured to discharge the liquid refrigerant from outside the stator core 18, and a guide groove 46 (see FIGS. 3, 4) formed on an outer peripheral surface of the stator core 18. The supply pipe 48 is placed above the stator core 18 and discharges the liquid refrigerant from an outlet of the supply pipe 48. The outlet is placed right above the guide groove 46 (described later). Note that, in FIGS. 1, 3, only one outlet is provided. However, a plurality of outlets may be provided at intervals in the circumferential direction. In either case, the outlet is set in a positional relationship that causes the liquid refrigerant discharged from the outlet to fall in the guide groove 46.

The guide groove 46 is a groove extending in the circumferential direction on the outer peripheral surface of the stator core 18. The guide groove 46 is arranged to pass all the supply cooling holes 40a. The liquid refrigerant supplied into the guide groove 46 is also guided into the supply cooling holes 40a by gravity in the middle of flowing downward along the guide groove 46. That is, the liquid refrigerant can be supplied to the supply cooling holes 40a by providing the supply pipe 48 and the guide groove 46.

The liquid refrigerant supplied to the supply cooling holes 40a falls down by gravity. Accordingly, the liquid refrigerant passes through the slots 24 corresponding to the supply cooling holes 40a from the radially inner ends of the supply cooling holes 40a and further falls downward in the gravitational direction. The refrigerant guide 50 catches the liquid refrigerant thus falling down and guides the liquid refrigerant to the slots 24 placed on the lower side in the gravitational direction.

More specifically, as illustrated in FIG. 1, the refrigerant guide 50 is a generally annular member provided between the stator core 18 and the rotor 12. The material of the refrigerant guide 50 is not limited in particular, provided that the material is a nonmagnetic material. Accordingly, the refrigerant guide 50 may be made of resin, for example. Further, the refrigerant guide 50 may be made of a material having a nonmagnetic property and a high heat transfer property, e.g., brass or alumina. When the refrigerant guide 50 is made of a material having a high heat transfer property, heat of the liquid refrigerant can be dispersed evenly, thereby making it possible to effectively prevent local concentration of the heat.

The shape of the refrigerant guide 50 is not limited particularly, provided that the refrigerant guide 50 can receive the liquid refrigerant falling down from the slots 24 toward the rotor 12. In the present embodiment, as illustrated in FIG. 3, the refrigerant guide 50 includes an inner peripheral wall 52 extending along the outer peripheral surface of the rotor 12, a pair of side walls 56 provided such that the side walls 56 stand radially outwardly from the opposite ends of the inner peripheral wall 52 in the axial direction, and a pair of outer peripheral walls 54 provided such that the outer peripheral walls 54 extend in the axial direction from respective radially outer ends of the side walls 56 toward their respective counterpart side walls 56.

The refrigerant guide 50 is connected to the connecting member 38 of the stator coil 30 via a connector 64. The connector 64 is a member configured such that a first end is fixed to the inner peripheral wall 52 and a second end is fixed to the connecting member 38. One connector 64 may be provided or a plurality of connectors 64 may be provided at intervals in the circumferential direction. In either case, by provided the connector 64, the refrigerant guide 50 can be maintained at a predetermined position. Note that the material of the connector 64 is not limited particularly. However, in a case where the refrigerant guide 50 is made of a conductive material, at least part of the connector 64 may be made of an insulating material by which the refrigerant guide 50 is insulated from the connecting member 38.

Further, as illustrated in FIGS. 3, 4, a generally rectangular notch portion 44 is formed in an axially central part of a radially inner end of each of the teeth 20. The refrigerant guide 50 is placed to pass through the inside of the notch portion 44. In other words, part of the refrigerant guide 50 is accommodated in each notch portion 44. With such a configuration, it is possible to secure a sufficient gap between the refrigerant guide 50 and the rotor 12 without increasing a gap between the stator 14 and the rotor 12.

Figure 6:
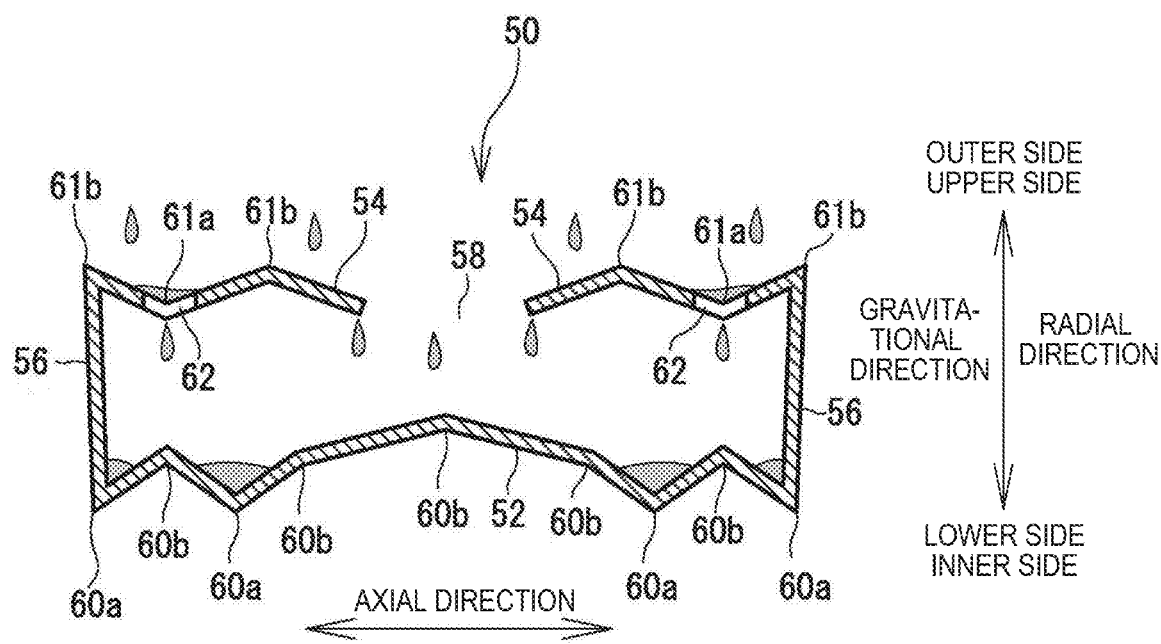
FIG. 6 is a radial sectional view of a refrigerant guide at a position of zero o'clock in FIG. 1.
Figure 7:
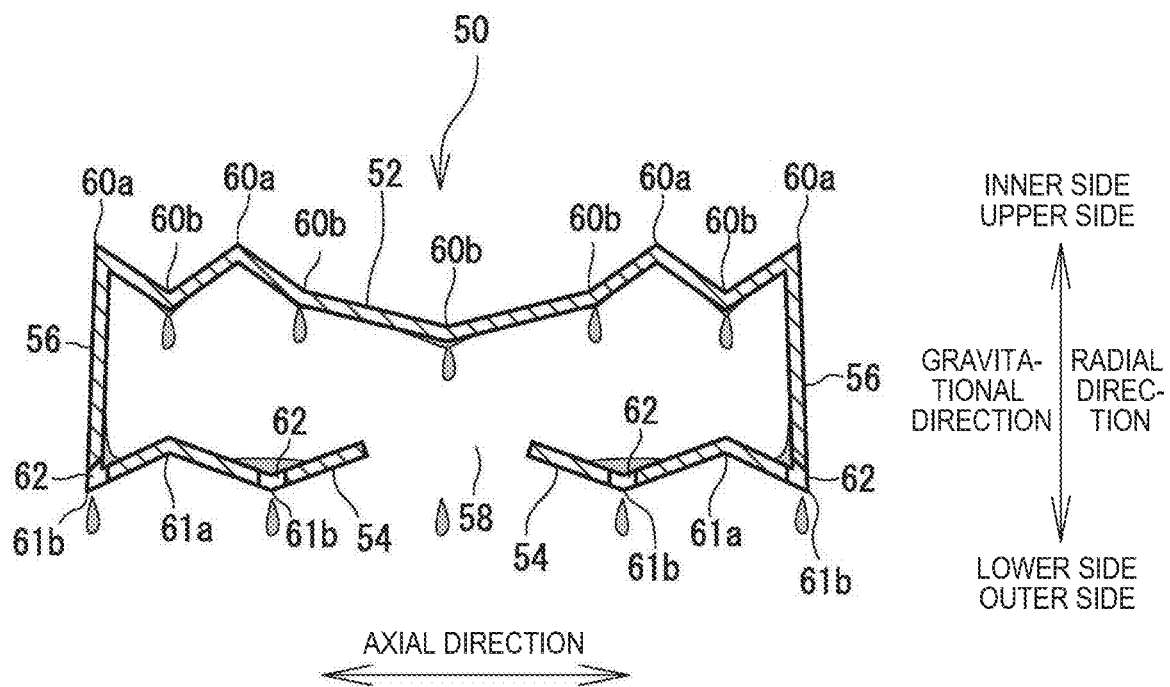
FIG. 7 is a radial sectional view of the refrigerant guide at a position of six o'clock in FIG. 1.

Next will be described the shape of the refrigerant guide 50, more specifically. FIG. 6 is a radial sectional view of the refrigerant guide 50 at a position of zero o'clock in FIG. 1. Similarly, FIG. 7 is a radial sectional view of the refrigerant guide 50 at a position of six o'clock in FIG. 1.

As described above, the refrigerant guide 50 includes the inner peripheral wall 52, the side walls 56, and the outer peripheral walls 54. The inner peripheral wall 52 is constituted by a plurality of surfaces arranged in the axial direction such that an angle is formed between adjacent surfaces. Accordingly, the inner peripheral wall 52 includes a plurality of V-shaped portions 60a, 60b in each of which two surfaces intersect with each other or the inner peripheral wall 52 and the side wall 56 intersect with each other. In the following description, a V-shaped portion projecting radially inwardly is referred to as an "inner V-shaped portion 60a" and a V-shaped portion projecting radially outwardly is referred to as an "outer V-shaped portion 60b." When the inner V-shaped portion 60a and the outer V-shaped portion 60b are not distinguished from each other, they are just referred to as "V-shaped portions 60." By providing the V-shaped portions 60 as such, the liquid refrigerant guided inside the refrigerant guide 50 is easily gathered together in the V-shaped portions 60 under the influence of gravity. When the liquid refrigerant is gathered together as such, the liquid refrigerant easily flows downward or easily falls down. In other words, by providing the V-shaped portions 60 in the inner peripheral wall 52, the liquid refrigerant can easily flow more smoothly.

Here, the inner peripheral wall 52 is a wall facing the outer peripheral surface of the rotor 12. Differently from the outer peripheral wall 54, holes or openings are not formed in the inner peripheral wall 52. On this account, the liquid refrigerant entering the refrigerant guide 50 cannot reach the rotor 12 over the inner peripheral wall 52.

The outer peripheral walls 54 extend from the side walls 56, respectively. The outer peripheral wall 54 extending from one of the side walls 56 does not reach a tail end of the outer peripheral wall 54 extending from the other one of the side walls 56, and thus, a passage opening 58 is formed between the two outer peripheral walls 54. The passage opening 58 is continuously present in the circumferential direction. Further, similarly to the inner peripheral wall 52, the outer peripheral wall 54 is also constituted by a plurality of surfaces arranged in the axial direction such that an angle is formed between adjacent surfaces, and thus, the outer peripheral wall 54 includes a plurality of V-shaped portions 61a, 61b. Similarly to the V-shaped portions 60, V-shaped portions 61 are referred to as an "inner V-shaped portion 61a," an "outer V-shaped portion 61b," or the "V-shaped portion 61" properly as needed.

By providing the V-shaped portions 61 in the outer peripheral walls 54, the liquid refrigerant is easily gathered together in valley parts of the V-shaped portions 61. In the present embodiment, via-holes 62 through which the liquid refrigerant passes are formed in each of the valley parts where the liquid refrigerant is easily gathered together. Accordingly, the liquid refrigerant moves to inside and outside the refrigerant guide 50 through the passage opening 58 and the via-holes 62. In the present embodiment, in order to supply the liquid refrigerant dispersedly, positions of the via-holes 62, the number of the via-holes 62, and magnitudes of the via-holes 62 are changed depending on circumferential positions where the via-holes are provided.

For example, at a position of zero o'clock, the refrigerant guide 50 faces the supply cooling hole 40a in the radial direction. In this case, the liquid refrigerant falls down from right above the refrigerant guide 50 as illustrated in FIG. 6. The liquid refrigerant thus falling down passes through the passage opening 58 or lands on the outer peripheral wall 54. The liquid refrigerant landing on the outer peripheral wall 54 is gathered together in the inner V-shaped portion 61a by gravity. In order to guide the liquid refrigerant thus gathered together into the refrigerant guide 50, the via-hole 62 is formed in the inner V-shaped portion 61a at the position of zero o'clock. Hereby, the liquid refrigerant falling down on the outer peripheral wall 54 can be efficiently guided into the refrigerant guide 50. The liquid refrigerant inside the refrigerant guide 50 flows downward in the gravitational direction along the inner peripheral wall 52.

In the meantime, at a position of six o'clock, the refrigerant guide 50 faces the discharge cooling hole 40b in the radial direction. On this account, at the position of six o'clock, it is necessary to cause the liquid refrigerant inside the refrigerant guide 50 to fall down toward the slot 24 side that the refrigerant guide 50 faces as illustrated in FIG. 7. At the position of six o'clock, the inner peripheral wall 52 is placed above the outer peripheral wall 54 in the gravitational direction. On this account, the liquid refrigerant attached to the inner peripheral wall 52 just falls down by the action of gravity or falls down by the action of gravity after the liquid refrigerant is gathered together in the outer V-shaped portion 60b. Part of the liquid refrigerant thus falling down passes through the passage opening 58 and just advances to the slot 24 side. In the meantime, the liquid refrigerant falling down on the outer peripheral wall 54 is gathered together in the outer V-shaped portion 61b by gravity. In order to cause the liquid refrigerant thus gathered together to the slot 24 side, the via-hole 62 is provided in the outer V-shaped portion 61b at the position of six o'clock.

As such, below the central horizontal line Lh, the via-hole 62 is formed in the outer V-shaped portion 61b in the outer peripheral wall 54. Here, below the central horizontal line Lh, the magnitudes of the via-holes 62 and the number of the via-holes 62 affect refrigerant supply amounts to the slots 24. Accordingly, below the central horizontal line Lh, the number of the via-holes 62 and the magnitudes of the via-holes 62 are adjusted such that respective refrigerant supply amounts to the slots become nearly equal to each other.

For example, at the position of six o'clock, the outer peripheral wall 54 is generally perpendicular to the gravitational direction, and therefore, the liquid refrigerant attached to the outer peripheral wall 54 can relatively easily pass through the via-hole 62. In the meantime, as the position approaches a direction of three o'clock or nine o'clock from six o'clock, an inclination angle of the outer peripheral wall 54 from the gravitational direction decreases. As the inclination angle of the outer peripheral wall 54 from the gravitational direction is smaller, the liquid refrigerant easily falls downward along the outer peripheral wall 54 without passing through the via-hole 62. That is, below the central horizontal line Lh, the liquid refrigerant becomes hard to pass through the via-holes 62 as the via-holes 62 get closer to the upper side in the gravitational direction. In such a case, when the number of the via-holes 62 and the magnitudes of the via-holes 62 are set uniformly regardless of circumferential positions, the refrigerant supply amounts to the slots 24 decrease as the via-holes 62 get closer to the upper side in the gravitational direction, so that the stator coil 30 cannot be cooled evenly. In view of this, in the present embodiment, below the central horizontal line Lh, at least either of the number of the via-holes 62 and areas of the via-holes 62 is made smaller as the via-holes 62 get closer to the lower side in the gravitational direction. Hereby, below the central horizontal line Lh, the refrigerant can be supplied dispersedly more evenly.

Next will be described an effect of the cooling structure. At the time when the rotary electric machine 10 is cooled, the liquid refrigerant is supplied to the supply cooling holes 40a from outside the stator core 18 as described above. The liquid refrigerant flows from the radially outer ends of the supply cooling holes 40a to the radially inner ends of the supply cooling holes 40a by gravity such that the liquid refrigerant is discharged to their corresponding slots 24. After the liquid refrigerant exchanges heat with the stator coil 30 in the slots 24, the liquid refrigerant falls downward from the slots 24. Since the refrigerant guide 50 is provided between the slots 24 and the rotor 12, the liquid refrigerant falling downward from the slots 24 is caught by the refrigerant guide 50 without reaching the rotor 12. More specifically, the liquid refrigerant lands on the inner peripheral wall 52 through the passage opening 58 and the via-holes 62. The liquid refrigerant landing on the inner peripheral wall 52 flows downward along the inner peripheral wall 52 due to the action of gravity.

Below the central horizontal line Lh, the inner peripheral wall 52 is placed above the outer peripheral walls 54 in the gravitational direction. Accordingly, below the central horizontal line Lh, the liquid refrigerant falls down from the inner peripheral wall 52 side to the outer peripheral wall 54 side due to the action of gravity and further falls down, via the passage opening 58 or the via-holes 62, to the slot 24 side that the refrigerant guide 50 faces in the radial direction. The liquid refrigerant falling down to the slots 24 exchanges heat with the stator coil 30 in the slots 24 and further falls downward. When the liquid refrigerant finally reaches radially outer walls of the slots 24 (the inner peripheral surface of the yoke 22), the liquid refrigerant is discharged outside the stators 14 through the discharge cooling holes 40b. The liquid refrigerant thus discharged is accumulated in a bottom portion of the housing case. The liquid refrigerant thus accumulated is pumped up by a pump and is then supplied to the supply pipe 48 again.

As is apparent from the above description, in the present embodiment, the liquid refrigerant can be directly supplied to the stator coil 30 dispersedly. As a result, the rotary electric machine 10, particularly, the stator coil 30 having a large calorific value can be cooled effectively. In the meantime, in the present embodiment, the refrigerant guide 50 configured to catch the liquid refrigerant falling down is provided between the rotor 12 and the stator 14. Hereby, it is possible to effectively prevent the liquid refrigerant from being attached to the rotor 12 and to effectively restrain a decrease in a drag loss of the rotor 12.

Note that the configuration described herein is an example. When the cooling structure for the rotary electric machine 10 includes the cooling holes 40 penetrating from the outer peripheral surface of the stator core 18 to the slots 24, the refrigerant supply mechanism configured to supply liquid refrigerant to the supply cooling holes 40a, and the refrigerant guide 50 provided between the rotor 12 and the stator 14 and configured to catch the liquid refrigerant falling down and to guide the liquid refrigerant to the slots 24 placed on the lower side in the gravitational direction, other configurations of the cooling structure may be changed.

Figure 8:
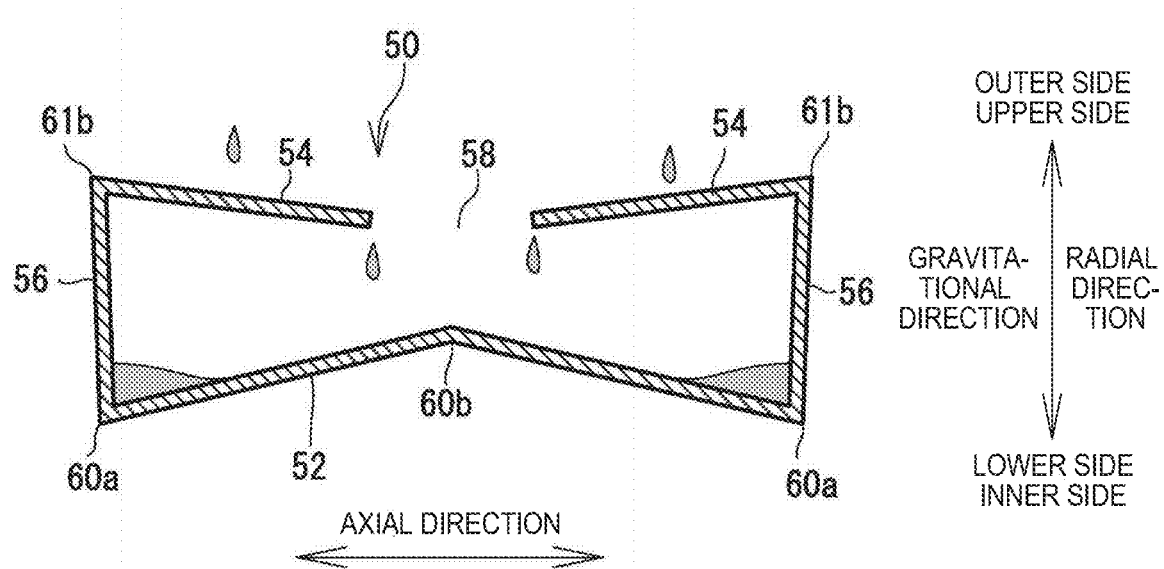
FIG. 8 is a radial sectional view of a refrigerant guide of another example at a position of zero o'clock.
Figure 9:
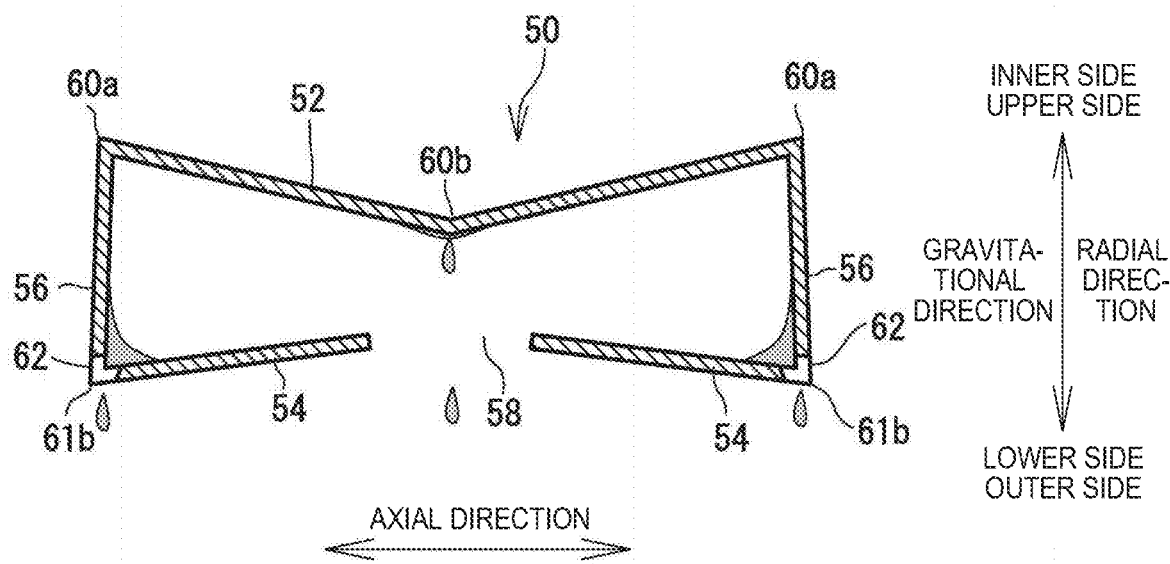
FIG. 9 is a radial sectional view of the refrigerant guide of another example at a position of six o'clock.

For example, the shape of the refrigerant guide 50 may be changed appropriately. Accordingly, as illustrated in FIGS. 8, 9, the refrigerant guide 50 may have a shape in which the inner peripheral wall 52 includes only two surfaces forming an angle between them, and the outer peripheral walls 54 each include only one surface such that the surface is inclined from its counterpart outer peripheral wall 54. In this case, in a range above the central horizontal line, the via-hole 62 may not be provided in the outer peripheral walls 54 as illustrated in FIG. 8. Further, in a range below the central horizontal line, the via-hole 62 should be provided in the outer V-shaped portion 61b formed by the outer peripheral wall 54 and the side wall 56, as illustrated in FIG. 9.

Further, as another embodiment, the inner peripheral wall 52 and the outer peripheral walls 54 may be each constituted by one surface generally parallel to the axial direction. Further, the side walls 56 and the outer peripheral walls 54 of the refrigerant guide 50 may be omitted, provided that the refrigerant guide 50 includes the inner peripheral wall 52 provided between the stator 14 and the rotor 12. Note that, in a case where the side walls 56 are omitted, the axial dimension of the inner peripheral wall 52 may be set to be equal to or larger than the axial dimension of the rotor 12 in order to prevent the liquid refrigerant caught by the inner peripheral wall 52 from falling down to the rotor 12 side from the opposite ends of the inner peripheral wall 52.

Figure 10:
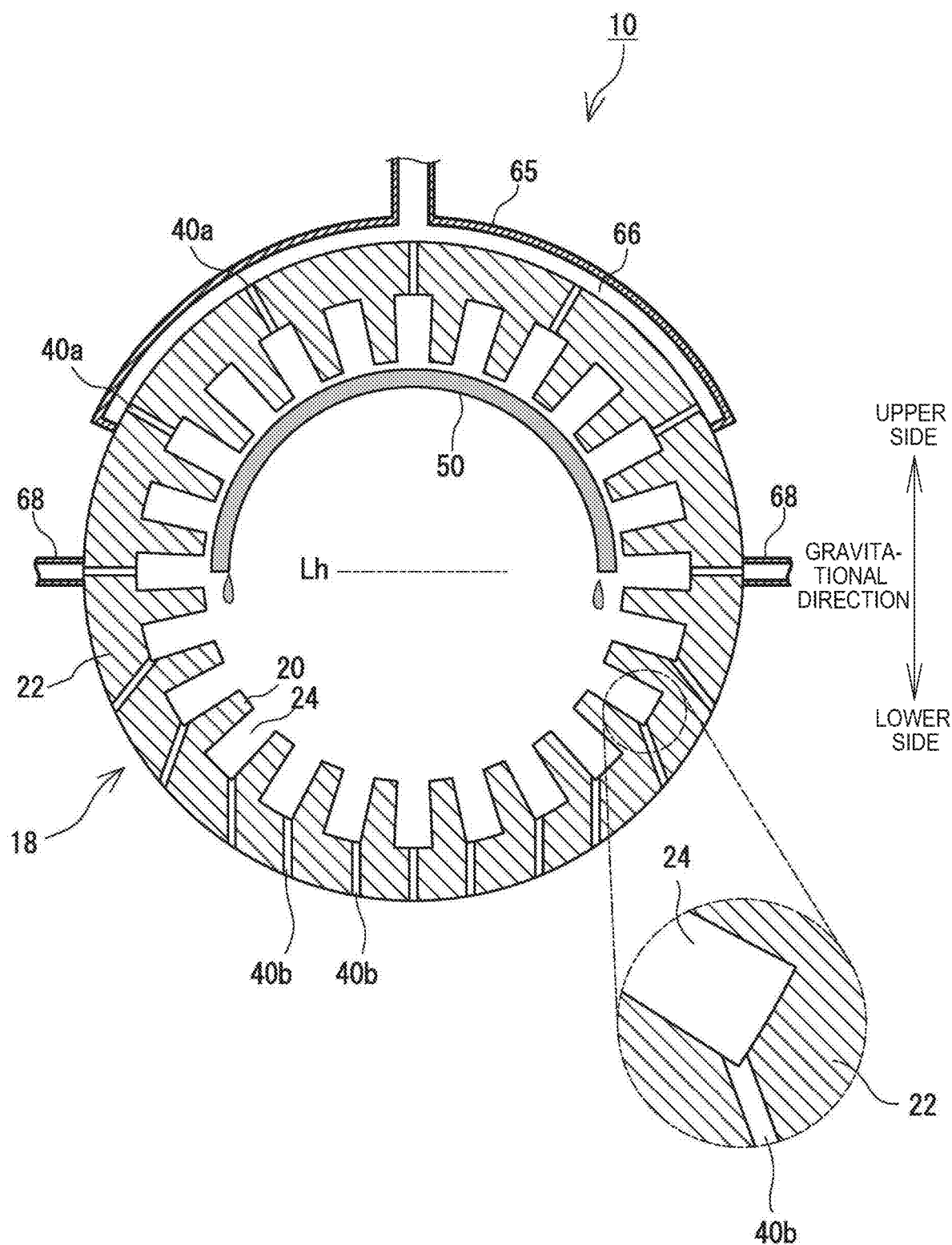
FIG. 10 is a view illustrating a cooling structure of another example.

Further, the refrigerant guide 50 is not limited to an annular shaped and may have other shapes, provided that the refrigerant guide 50 can prevent the liquid refrigerant from being attached to the rotor 12. For example, as illustrated in FIG. 10, the refrigerant guide 50 may be formed in an arcuate shape, e.g., a semi-circular shape that can cover the range above the central horizontal line Lh. Even in this case, the refrigerant guide 50 can catch the liquid refrigerant falling down from the supply cooling hole 40a without causing the liquid refrigerant from reaching the rotor 12. As a result, it is possible to restrain a decrease in a drag loss of the rotor 12.

Further, the number of the cooling holes 40 is not limited, provided that at least one cooling hole 40 is provided above the central horizontal line Lh, and at least one cooling hole 40 is provided below the central horizontal line Lh. Accordingly, as illustrated in FIG. 10, the supply cooling hole 40a may be provided in every other slot 24. Similarly, the discharge cooling hole 40b may be provided in every other slot 24.

Further, the extending direction of the cooling holes 40 is not limited to the radial direction, and the cooling holes 40 may extend in other directions. Further, in FIGS. 1, 2, the cooling holes 40 are connected to circumferential centers of respective slots 24. However, the cooling holes 40 may be connected to corners of the respective slots 24. Particularly, in the range below the central horizontal line Lh, the liquid refrigerant supplied to the slots 24 is accumulated in their corners on the lower side in the gravitational direction. In order to discharge the liquid refrigerant quickly, the discharge cooling holes 40b may be connected to the corners, of the slots 24, on the lower side in the gravitational direction, as illustrated in FIG. 10.

Further, the configuration of the refrigerant supply mechanism may be changed appropriately, provided that the liquid refrigerant can be supplied to the supply cooling hole 40a. For example, instead of the supply pipe 48 and the guide groove 46, a cover 65 may be provided such that a narrow flow path space 66 is formed between the cover 65 and the outer peripheral surface of the stator core 18 as illustrated in FIG. 10, so that the liquid refrigerant may be supplied through the flow path space 66.

Further, the liquid refrigerant may be also supplied by use of force other than gravity. For example, in a case of the slots 24 placed at generally the same height position as the central horizontal line Lh, that is, the slots 24 placed at positions of three o'clock and nine o'clock in FIG. 10, it is difficult to supply the liquid refrigerant sufficiently thereto by using only gravity. In view of this, the liquid refrigerant may be pumped from outside the stator 14 to the slots 24 at the positions of three o'clock and nine o'clock. For example, as illustrated in FIG. 10, flow paths 68 may be connected to the cooling holes 40 at the positions of three o'clock and nine o'clock, so that the liquid refrigerant may be supplied to the cooling holes 40 through the flow paths 68. By giving a sufficient pressure, the liquid refrigerant flows vigorously in the horizontal direction. Hereby, the stator coil 30 inside the slots 24 at the positions of three o'clock and nine o'clock can be cooled.

What is claimed is:

1. A cooling structure for a rotary electric machine placed in a posture where an axial direction of the rotary electric machine intersects with a vertical direction, the cooling structure comprising:
    a plurality of cooling holes provided such that the cooling holes penetrate from an outer peripheral surface of a stator core to respective slots;
    a refrigerant supply mechanism configured to supply liquid refrigerant to supply cooling holes among the cooling holes, the supply cooling holes being configured such that radially outer ends of the supply cooling holes are placed above radially inner ends of the supply cooling holes in a gravitational direction; and
    a refrigerant guide provided between a rotor and a stator, the refrigerant guide being configured to catch the liquid refrigerant falling down from the radially inner ends of the supply cooling holes through slots corresponding to the supply cooling holes among the respective slots and to guide the liquid refrigerant to slots placed on a lower side in the gravitational direction among the respective slots,
    wherein the refrigerant guide includes:
        an inner peripheral wall extending along an outer peripheral surface of the rotor,
        a pair of side walls provided such that the side walls stand radially outwardly from opposite ends of the inner peripheral wall in the axial direction of the refrigerant guide, and
        a pair of outer peripheral walls provided such that the outer peripheral walls extend in the axial direction from respective radially outer ends of the side walls toward respective counterpart side walls.

2. The cooling structure according to claim 1, wherein the refrigerant guide has an annular shape disposed concentrically with the stator and the rotor.

3. The cooling structure according to claim 1, wherein a plurality of via-holes through which the liquid refrigerant passes is formed in at least either of the outer peripheral walls and corners between the outer peripheral walls and the side walls.

4. The cooling structure according to claim 3, wherein, in a range below a central horizontal line that is a horizontal line passing through a rotation center of the rotor, at least either of the number of the via-holes and areas of the via-holes is made smaller as the via-holes get closer to a lower side in the gravitational direction.

5. The cooling structure according to claim 3, wherein the inner peripheral wall and the outer peripheral walls are each constituted by two or more surfaces arranged in the axial direction such that an angle is formed between adjacent surfaces among the two or more surfaces, and in each of the outer peripheral walls, the via-holes are formed in a V-shaped portion formed between two surfaces intersecting with each other among the two or more surfaces or in a V-shaped portion formed between a corresponding one of the side walls and a surface among the two or more surfaces, the surface intersecting with the corresponding one of the side walls.

6. The cooling structure according to claim 1, wherein the refrigerant guide is made of a material having a nonmagnetic property and a high heat transfer property.

7. A cooling structure for a rotary electric machine placed in a posture where an axial direction of the rotary electric machine intersects with a vertical direction, the cooling structure comprising:
 a plurality of cooling holes provided such that the cooling holes penetrate from an outer peripheral surface of a stator core to respective slots;
 a refrigerant supply mechanism configured to supply liquid refrigerant to supply cooling holes among the cooling holes, the supply cooling holes being configured such that radially outer ends of the supply cooling holes are placed above radially inner ends of the supply cooling holes in a gravitational direction; and
 a refrigerant guide provided between a rotor and a stator, the refrigerant guide being configured to catch the liquid refrigerant falling down from the radially inner ends of the supply cooling holes through slots corresponding to the supply cooling holes among the respective slots and to guide the liquid refrigerant to slots placed on a lower side in the gravitational direction among the respective slots,
 wherein
 a stator coil of the stator includes a plurality of segment coils, and a connecting member via which tail ends of two segment coils among the segment coils are connected to each other in each of the respective slots, and
 the refrigerant guide is fixed to the connecting member.

8. A cooling structure for a rotary electric machine placed in a posture where an axial direction of the rotary electric machine intersects with a vertical direction, the cooling structure comprising:
 a plurality of cooling holes provided such that the cooling holes penetrate from an outer peripheral surface of a stator core to respective slots;
 a refrigerant supply mechanism configured to supply liquid refrigerant to supply cooling holes among the cooling holes, the supply cooling holes being configured such that radially outer ends of the supply cooling holes are placed above radially inner ends of the supply cooling holes in a gravitational direction; and
 a refrigerant guide provided between a rotor and a stator, the refrigerant guide being configured to catch the liquid refrigerant falling down from the radially inner ends of the supply cooling holes through slots corresponding to the supply cooling holes among the respective slots and to guide the liquid refrigerant to slots placed on a lower side in the gravitational direction among the respective slots,
 wherein a notch portion is formed in an axially central part of a radially inner end of each of teeth of the stator core such that at least part of the refrigerant guide is accommodated in the notch portion.

* * * * *